(12) United States Patent
Aisaka et al.

(10) Patent No.: US 11,183,696 B2
(45) Date of Patent: Nov. 23, 2021

(54) STAINLESS STEEL SUBSTRATE, FUEL CELL SEPARATOR, AND FUEL CELL

(71) Applicant: Toyota Jidosha Kabushiki Kaisha, Toyota (JP)

(72) Inventors: Takashi Aisaka, Miyoshi (JP); Takashi Kono, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/285,484

(22) Filed: Feb. 26, 2019

(65) Prior Publication Data

US 2019/0267640 A1    Aug. 29, 2019

(30) Foreign Application Priority Data

Feb. 28, 2018 (JP) .............................. JP2018-035148

(51) Int. Cl.
| | |
|---|---|
| *H01M 8/0232* | (2016.01) |
| *C22C 14/00* | (2006.01) |
| *H01M 8/1018* | (2016.01) |
| *H01M 8/1039* | (2016.01) |

(52) U.S. Cl.
CPC .......... *H01M 8/0232* (2013.01); *C22C 14/00* (2013.01); *H01M 8/1039* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 2002/0160248 A1 | 10/2002 | Takao et al. | |
| 2006/0286432 A1* | 12/2006 | Rakowski | H01M 8/0206 429/442 |
| 2017/0301929 A1* | 10/2017 | Tarutani | C22C 38/42 |

FOREIGN PATENT DOCUMENTS

| | | | |
|---|---|---|---|
| EP | 3480334 A1 | 5/2019 | |
| JP | 2003223904 A | 8/2003 | |
| JP | 2010205443 A | 9/2010 | |
| JP | 2018131643 A | 8/2018 | |
| WO | 2016052622 A1 | 4/2016 | |
| WO | WO-2016052622 A1 * | 4/2016 | .......... H01M 8/1018 |
| WO | 2018008658 A1 | 1/2018 | |

* cited by examiner

*Primary Examiner* — Daniel S Gatewood
(74) *Attorney, Agent, or Firm* — Dinsmore & Shohl LLP (57) ABSTRACT

A stainless steel substrate used for a fuel cell separator that is excellent in corrosion resistance is disclosed. The embodiments relate to a stainless steel substrate used for a fuel cell separator, comprising substantially no Nb, and comprising Ti.

8 Claims, 8 Drawing Sheets

STAINLESS STEEL SUBSTRATE, FUEL CELL SEPARATOR, AND FUEL CELL

CROSS REFERENCE TO RELATED APPLICATIONS

The present application claims priority from Japanese patent application JP 2018-035148 filed on Feb. 28, 2018, the content of which is hereby incorporated by reference into this application.

BACKGROUND

Technical Field

The present disclosure relates to a stainless steel substrate for use as a fuel cell separator. In addition, the present disclosure relates to a fuel cell separator. In addition, the present disclosure relates to a fuel cell.

Background Art

A cell of a polymer electrolyte fuel cell comprises a membrane electrode assembly (MEA) comprising an ion-permeable electrolyte membrane, and an anode side catalyst layer (electrode layer) and a cathode side catalyst layer (electrode layer) sandwiching the electrolyte membrane. Gas diffusion layers (GDLs) for providing a fuel gas or an oxidant gas and collecting electricity produced by an electrochemical reaction are formed on both sides of the membrane electrode assembly. The membrane electrode assembly having the GDLs disposed on both sides is referred to as a MEGA (Membrane Electrode & Gas Diffusion Layer Assembly), and the MEGA is sandwiched between a pair of separators. Here, the MEGA is the power generation portion of the fuel cell, and when there are no gas diffusion layers, the membrane electrode assembly is the power generation portion of the fuel cell.

As stainless steel used in a polymer electrolyte fuel cell, JP 2010-205443 A discloses stainless steel for a polymer electrolyte fuel cell separator with a small amount of ions dissolved at high potential, containing C: 0.03% or less, N: 0.03% or less, Si: 0.01 to 2.0%, Mn: 0.01 to 2.0%, Al: 0.001 to 0.3%, Cr: 20 to 35%, Mo: 4.0% or less, and Nb: 0.2 to 2.0% in terms of % by mass, the balance being Fe and unavoidable impurities, and further the amount of Cr, the amount of Nb, and the amount of Mo satisfying the relationship of a predetermined formula. In addition, JP 2010-205443 A describes Nb being an element effective in fixing C and N in steel as a carbonitride to improve corrosion resistance and press formability.

In addition, International Publication No. WO 2016/052622 discloses a ferritic stainless steel material which has a predetermined chemical composition and in which a value calculated by a predetermined formula is 20 to 45%, and $M_2B$ type boride-based metal precipitates are dispersed in a parent phase comprising only a ferrite phase, and exposed to the surface. In addition, International Publication No. WO 2016/052622 describes Nb being an optionally added element in the invention of International Publication No. WO 2016/052622, but being an element for stabilizing C and N in steel.

SUMMARY

As described above, it is known that Nb as a sensitization inhibitor is added to a stainless steel substrate used as a fuel cell separator. Here, sensitization is a phenomenon in which the Cr concentration along grain boundaries in a metal decreases, and Cr-deficient portions (portions having low Cr concentration) are produced. The sensitization is caused by the fact that carbon that is an impurity present around grain boundaries forms metal carbides ($Cr_{23}C_6$ and the like) with Cr, and gathers Cr around the grain boundaries.

However, even if a stainless steel substrate whose corrosion resistance is improved by comprising Nb as a sensitization inhibitor is used as a fuel cell separator, corrosion may occur in a corrosive environment. Particularly, a separator of a polymer electrolyte fuel cell is placed in a corrosive environment harsh for stainless steel, including the dissolution of $F^-$ ions from the solid polymer membrane, the inflow of $Cl^-$ ions from the outside air, and low pH due to the concentration of $H^+$ ions in produced water, and therefore the above problem emerges significantly. Therefore, a stainless steel substrate used for a fuel cell separator is required to have superior corrosion resistance.

Accordingly, the present disclosure provides a stainless steel substrate that is excellent in corrosion resistance.

Figure 1:
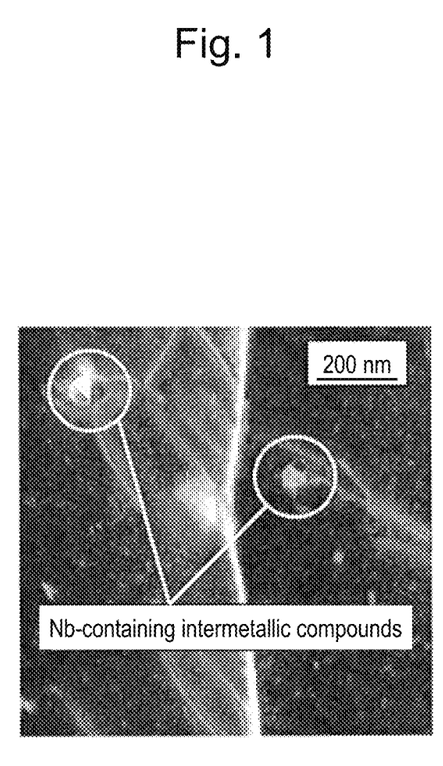
FIG. 1 is a TEM photograph of a stainless steel substrate comprising Nb-containing intermetallic compounds.
Figure 2:
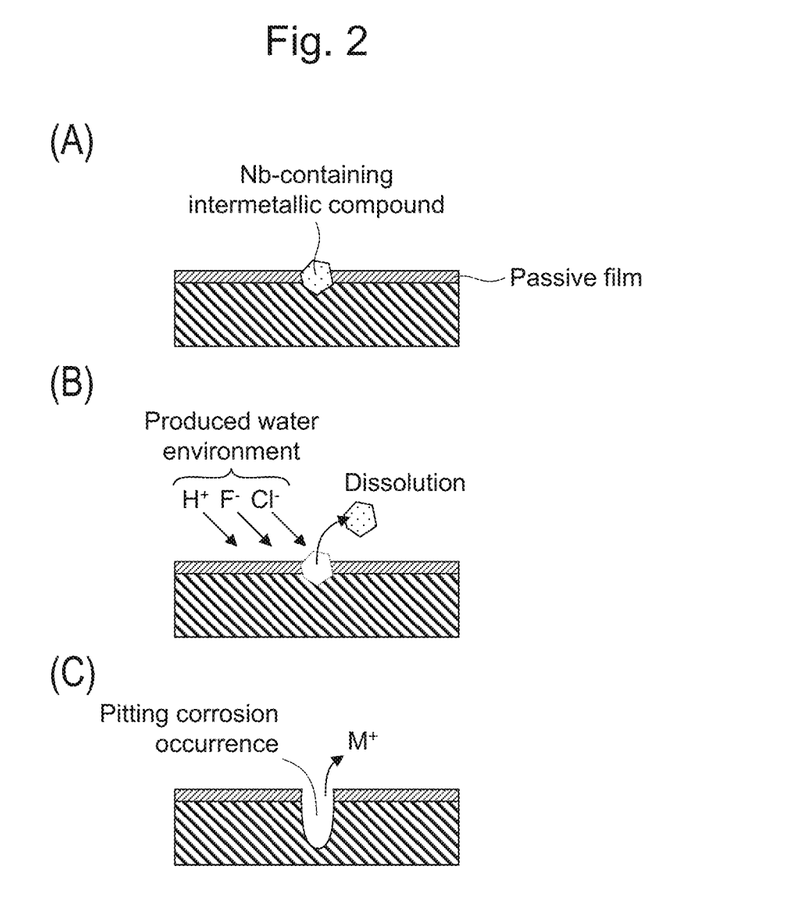
FIG. 2 is a schematic diagram for explaining a flow in which pitting corrosion occurs with a pit formed by the dissolution of a precipitate of a Nb-containing intermetallic compound being a starting point.

The present inventors have studied diligently, and newly found that intermetallic compounds containing Nb, that is, Nb-containing intermetallic compounds, are precipitated in a stainless steel substrate comprising Nb, precipitates of these Nb-containing intermetallic compounds dissolve as metal ions in a corrosive environment, and pitting corrosion occurs in the stainless steel substrate with these dissolved portions being starting points. More specifically, for example, in a commercially available stainless steel substrate comprising Nb (for example, SUS447J1L), precipitates of Nb-containing intermetallic compounds are present as shown in the TEM photograph of FIG. 1. The precipitates of the Nb-containing intermetallic compounds are present particularly around grain boundaries. As shown in FIG. 2, when these precipitates of the Nb-containing intermetallic compounds are placed in the corrosive environment of a fuel cell in which an acid, fluorine ions, chlorine ions, and the like are present, the precipitates dissolve as metal ions. Then, with these dissolved portions being starting points, corrosion proceeds further, and pitting corrosion occurs in the stainless steel substrate. Specifically, FIG. 2(A) shows a state in which a precipitate of a Nb-containing intermetallic compound is present in a stainless steel substrate. Next, as shown in FIG. 2(B), this precipitate of the Nb-containing intermetallic compound dissolves in produced water comprising an acid, fluorine ions, chlorine ions, and the like. Particularly, under the operation of a fuel cell, potential is applied, and therefore the dissolution of the precipitate is likely to proceed. Next, as shown in FIG. 2(C), with a pit formed by the dissolution of the precipitate being a starting point, pitting corrosion proceeds.

Accordingly, the present inventors have obtained a stainless steel substrate excellent in corrosion resistance by containing substantially no Nb, and containing titanium in a stainless steel substrate as a sensitization inhibitor instead of Nb, and arrived at the embodiments.

Examples of aspects of the embodiments will be described below.

(1) A stainless steel substrate used for a fuel cell separator, comprising substantially no Nb, and comprising Ti.

(2) The stainless steel substrate according to (1), wherein a content of the Ti is 0.1 to 0.5% by mass.

(3) The stainless steel substrate according to (1) or (2), further comprising Ta.

(4) The stainless steel substrate according to (3), wherein a content of the Ta is 0.05 to 0.5% by mass.

(5) A fuel cell separator comprising a stainless steel substrate, wherein the stainless steel substrate comprises substantially no Nb, and comprises Ti.

(6) The fuel cell separator according to (5), wherein a content of the Ti is 0.1 to 0.5% by mass.

(7) The fuel cell separator according to (5) or (6), wherein the stainless steel substrate further comprises Ta.

(8) The fuel cell separator according to (7), wherein a content of the Ta is 0.05 to 0.5% by mass.

(9) A fuel cell comprising:

the fuel cell separator according to any one of (5) to (8); and a solid electrolyte membrane.

(10) The fuel cell according to (9), wherein the solid electrolyte membrane comprises a fluorine-based electrolyte resin.

Advantageous Effect

The present disclosure can provide a stainless steel substrate used for a fuel cell separator that is excellent in corrosion resistance.

DETAILED DESCRIPTION

Aspects of the embodiments will be described below.

(Stainless Steel Substrate)

One aspect of the embodiments relates to a stainless steel substrate used for a fuel cell separator, comprising substantially no Nb, and comprising Ti.

The stainless steel substrate according to the embodiments comprises substantially no Nb, and therefore substantially no such precipitates of Nb-containing intermetallic compounds as form starting points from which pitting corrosion occurs are present. In addition, in the embodiments, Ti is added as a sensitization inhibitor. Ti precipitates in the stainless steel substrate as Ti-containing intermetallic compounds (for example, Ti carbide, Ti nitride, or Ti carbonitride), but these Ti-containing intermetallic compounds are less likely to dissolve in a corrosive environment, and therefore less likely to form such parts as are the starting points of pitting corrosion. Therefore, in the stainless steel substrate according to the embodiments, the occurrence of corrosion can be suppressed even in a corrosive environment in a fuel cell, particularly in the highly corrosive environment of a polymer electrolyte fuel cell or the like.

As used herein, "comprising substantially no Nb" means that the stainless steel substrate according to the embodiments comprises no Nb at a detectable level, or even if the stainless steel substrate according to the embodiments comprises Nb at a detectable level, it is permissible when the stainless steel substrate comprises Nb to the extent that obtaining the effect of the embodiments is not hindered. In other words, "comprising substantially no Nb" means that the stainless steel substrate according to the embodiments may comprise Nb to the extent that obtaining the effect of the embodiments is not hindered. Specifically, in some embodiments, the content of Nb in the stainless steel substrate is 0.01% by mass or less, or 0.005% by mass or less. When the content of Nb is 0.01% by mass or less, Nb-containing intermetallic compounds in such an amount or size as to cause pitting corrosion are not formed. It is considered that 0.01% by mass is equal to or less than the detection limit in general chemical analysis.

As used herein, stainless steel means steel comprising 1.2% by mass or less of C and 10.5% or more of Cr as defined in the Japanese Industrial Standards (JIS).

The stainless steel substrate according to the embodiments comprises Ti. As described above, Ti has a function as a sensitization inhibitor, and can suppress the formation of metal carbides (such as $Cr_{23}C_6$ and the like) around grain boundaries. In addition, Ti precipitates as Ti-containing intermetallic compounds (for example, TiC and TiN), but as described above, these Ti-containing intermetallic compounds are less likely to dissolve in a corrosive environment, and therefore less likely to form such parts as are the starting points of pitting corrosion. As a result, the corrosion resistance of the stainless steel substrate can be improved. In some embodiments, the content of Ti is 0.1% by mass or more and 0.5% by mass or less. When the content of Ti is 0.1% by mass or more, the function of Ti as a sensitization inhibitor can be effectively exhibited. When the content of Ti is 0.5% by mass or less, excessive production of Ti-containing intermetallic compounds can be effectively suppressed. In some embodiments, the content of Ti contained in the stainless steel substrate is 0.2% by mass or more. In some embodiments, the content of Ti contained in the stainless steel substrate is 0.4% by mass or less, or 0.3% by mass or less.

In some embodiments, the stainless steel substrate further comprises Ta in addition to Ti. Ta can be contained as a sensitization inhibitor together with Ti. Ta precipitates as Ti- and Ta-containing intermetallic compounds (for example, carbides, nitrides, or carbonitrides) together with Ti, and these Ti- and Ta-containing intermetallic compounds are much less likely to dissolve in a corrosive environment, and therefore less likely to form such parts as are the starting points of pitting corrosion. As a result, the corrosion resistance of the stainless steel substrate can be more effectively improved. In some embodiments, the content of Ta is 0.05% by mass or more and 0.5% by mass or less. When the content of Ta is 0.05% by mass or more, sensitization can be effectively prevented. When the content of Ta is 0.5% by mass or less, excessive formation of Ti- and Ta-containing intermetallic compounds can be effectively suppressed. In some embodiments, the content of Ta contained in the stainless steel substrate is 0.10% by mass or more. In some embodiments, the content of Ta contained in the stainless steel substrate is 0.4% by mass or less, 0.3% by mass or less, or 0.2% by mass or less.

The ratio between Ti and Ta is not particularly limited, and is, for example, 1:5 to 5:1, 1:4 to 4:1, or 1:3 to 3:1.

In the embodiments, the stainless steel substrate comprises Fe as the main component, and comprises 18 to 32% by mass of Cr, 0 to 3.0% by mass of Mo, 0.1 to 0.5% by mass of Ti, and 0.05 to 0.5% by mass of Ta, in some cases. In some embodiments, the content of Mo is 0.1% by mass or more, 0.5% by mass or more, 1.0% by mass or more, or 1.5% by mass or more. In some embodiments, the content of Mo is 2.7% by mass or less, 2.5% by mass or less, or 2.3% by mass or less. In some embodiments, the content of Cr is 30% by mass or less.

In the embodiments, the stainless steel substrate comprises Fe as the main component, and comprises 18 to 30% by mass of Cr, 0 to 2.0% by mass of Mo, 0.1 to 0.5% by mass of Ti, 0.05 to 0.5% by mass of Ta, 0 to 0.02% by mass of C, 0 to 0.02% by mass of N, 0 to 0.1% by mass of Cu, 0 to 0.05% by mass of Al, 0 to 0.4% by mass of Si, 0 to 0.001% of S, 0 to 0.03% by mass of P, and 0 to 0.1% by mass of Mn.

The stainless steel substrate is not particularly limited, and is, for example, austenitic, ferritic, or austenitic-ferritic duplex.

The shape of the stainless steel substrate is not particularly limited, and is, for example, a plate shape.

The stainless steel substrate may comprise a protective film such as a metal oxide film on its surface other than an oxide film necessarily formed on the surface of the stainless steel substrate. The metal oxide film can be formed, for example, by a physical vapor deposition method (PVD) using sputtering, vacuum deposition, ionized deposition, ion plating, or the like. Examples of the metal oxide film include tin oxide having high electrical conductivity.

(Method for Manufacturing Stainless Steel Substrate)

The stainless steel substrate according to the embodiments can be manufactured, for example, by a raw material melting step, a refining step, a casting step, a hot rolling step, a cold rolling step, a pickling step, a foil rolling step, and a heat treatment step. More specifically, the stainless steel substrate can be obtained by the melting step of melting a raw material of stainless steel comprising at least Ti, the refining step of refining the molten raw material, the casting step of casting a stainless steel substrate from the refined raw material, the hot rolling step of hot-rolling the cast stainless steel substrate, the cold rolling step of cold-rolling the hot-rolled stainless steel substrate, the pickling step of subjecting the cold-rolled stainless steel substrate to pickling treatment, the foil rolling step of foil-rolling the stainless steel substrate subjected to pickling treatment, and the heat treatment step of heat-treating the foil-rolled stainless steel substrate.

As the raw material of stainless steel, for example, stainless steel powder can be used. The stainless steel powder comprises, for example, Fe as the main component, and comprises 18 to 32% by mass of Cr, in some embodiments.

Generally, a molten metal obtained by a melting step is subjected to rough decarburization treatment in a converter, an AOD furnace, an electric furnace, or the like as a primary refining step. Then, after this primary refining step, as a secondary refining step, oxygen gas is supplied under a reduced pressure atmosphere to further decrease carbon concentration in the molten metal. In some embodiments, Ti and/or Ta are added to the molten metal in slight amounts in this secondary refining step. Thus, Ti and Ta can easily form carbides or nitrides without forming oxides. As the secondary refining equipment, for example, RH vacuum degassing equipment and VOD (Vacuum Oxygen Decarburization) equipment can be used.

Examples of the precipitates of the Ti-containing intermetallic compounds include TiC and TiN. Examples of the precipitates of the Ti- and Ta-containing intermetallic compounds include carbides or nitrides. The presence of the precipitates of the Ti-containing intermetallic compounds or the precipitates of the Ti- and Ta-containing intermetallic compounds can be confirmed, for example, by SEM, EPMA, or TEM.

The compositions of the Ti-containing intermetallic compounds or the precipitates of the Ti- and Ta-containing intermetallic compounds can be determined, for example, by EDS or XRD.

(Structure of Fuel Cell)

A fuel cell according to the embodiments will be described below with reference to a drawing. A case where a fuel cell separator according to the embodiments is applied to a fuel cell to be mounted in a fuel cell vehicle or the like will be described below as one example. However, the present disclosure is not limited by such an example.

Figure 3:
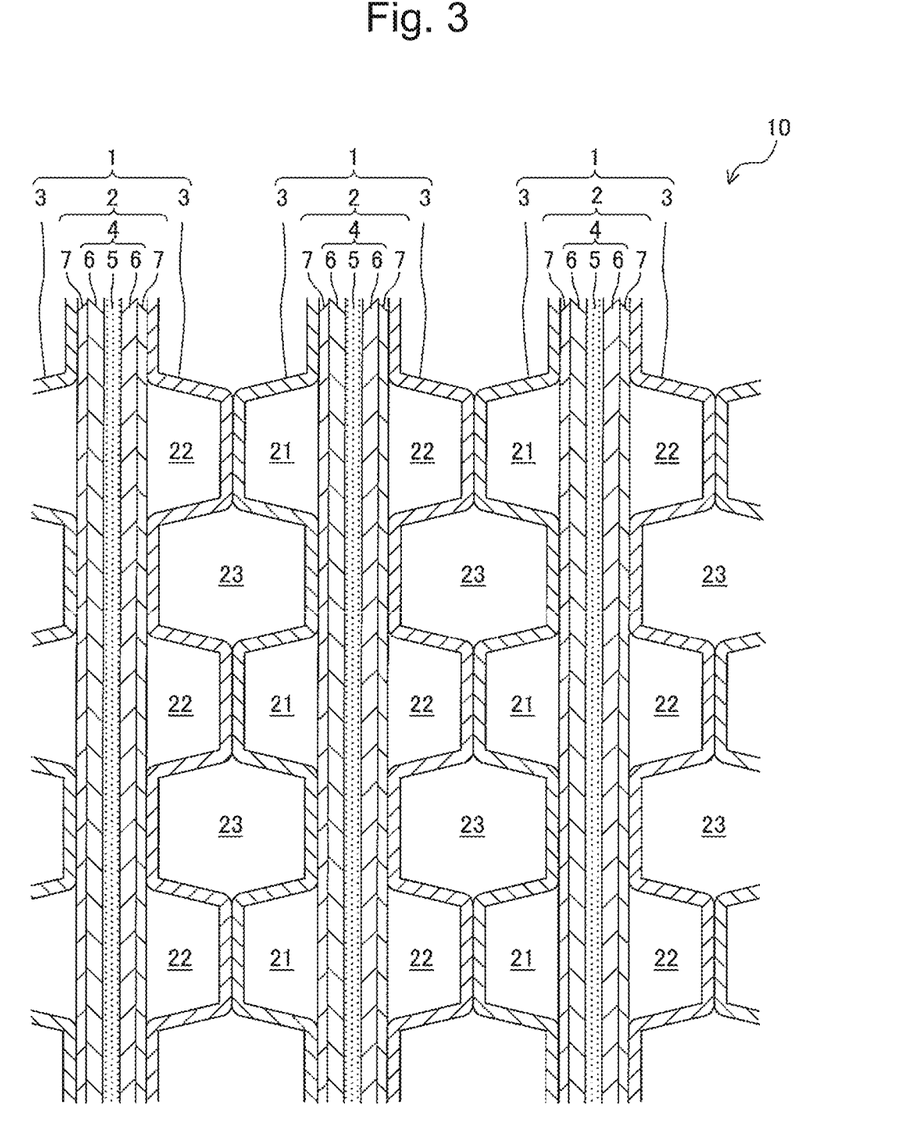
FIG. 3 is a schematic cross-sectional view for explaining an example of the configuration of a fuel cell according to the embodiments.

FIG. 3 is a diagram of the main part of a fuel cell stack (fuel cell) 10 seen in cross section. As shown in FIG. 3, a plurality of cells (single cells) 1 that are basic units are laminated in the fuel cell stack 10. Each cell 1 is a polymer electrolyte fuel cell that generates electromotive force by the electrochemical reaction of an oxidant gas (for example, air) and a fuel gas (for example, hydrogen). The cell 1 comprises a MEGA 2 and a separator 3 that is in contact with the MEGA 2 so as to define the MEGA 2. In the embodiments, the MEGA 2 is sandwiched between a pair of separators 3 and 3.

In the MEGA 2, a membrane electrode assembly (MEA) 4 and gas diffusion layers 7 and 7 disposed on both surfaces of the membrane electrode assembly 4 are integrated. The membrane electrode assembly 4 comprises an electrolyte membrane 5 and a pair of electrodes 6 and 6 joined so as to sandwich the electrolyte membrane 5. The electrolyte membrane 5 comprises a proton-conducting ion exchange membrane formed of a solid polymer material. The electrode 6 is formed, for example, of a porous carbon material supporting a catalyst such as platinum. The electrode 6 disposed on one side of the electrolyte membrane 5 is an anode, and the electrode 6 on the other side is a cathode. The gas diffusion layer 7 is formed of an electrically conductive member having gas permeability. Examples of the electrically conductive member having gas permeability include carbon porous bodies such as carbon paper or carbon cloth, or metal porous bodies such as metal meshes or foamed metals.

The MEGA 2 is the power generation portion of the fuel cell 10, and the separator 3 is in contact with the gas diffusion layer 7 of the MEGA 2. When the gas diffusion layer 7 is not present, the membrane electrode assembly 4 is the power generation portion, and in this case, the separator 3 is in contact with the membrane electrode assembly 4. Therefore, the power generation portion of the fuel cell 10 comprises the membrane electrode assembly 4, and is in contact with the separator 3.

The separator 3 is a plate-shaped member using a metal excellent in electrical conductivity, gas impermeability, and the like as a substrate. One surface of the separator 3 abuts the gas diffusion layer 7 of the MEGA 2, and the other surface abuts another adjacent separator 3.

Each separator 3 is formed in a wavy shape. For the shape of the separator 3, the shape of a wave is an isosceles trapezoid, and the top of the wave is flat, and both ends of this top form equal angles and are angular. In other words, each separator 3 has substantially the same shape whether it is seen from the front side or the back side. The top of the separator 3 is in surface contact with one gas diffusion layer 7 of the MEGA 2, and the top of the separator 3 is in surface contact with the other gas diffusion layer 7 of the MEGA 2.

Gas flow paths 21 defined between the gas diffusion layer 7 and the separator 3 on one electrode (that is, anode) 6 side are flow paths through which a fuel gas flows, and gas flow paths 22 defined between the gas diffusion layer 7 and the separator 3 on the other electrode (that is, cathode) 6 side are flow paths through which an oxidant gas flows. When the fuel gas is supplied to the gas flow paths 21 on one side opposed via the cell 1, and the oxidant gas is supplied to the gas flow paths 22, an electrochemical reaction occurs in the cell 1 to produce electromotive force.

Further, one cell 1 and another cell 1 adjacent to the one cell 1 are disposed with the electrode 6 that is an anode and the electrode 6 that is a cathode opposed to each other. In addition, the rear side top of the separator 3 disposed along the electrode 6 that is an anode in one cell 1, and the rear side top of the separator 3 disposed along the electrode 6 that is a cathode in another cell 1 are in surface contact with each other. Water as a cooling medium for cooling the cells 1 flows through spaces 23 defined between the separators 3 and 3 that are in surface contact with each other between two adjacent cells 1.

The fuel cell separator according to the embodiments comprises the stainless steel substrate according to the embodiments described above. Protective films such as tin oxide films may be provided on both surfaces of the stainless steel substrate (that is, the surface on the side to be in contact with the gas diffusion layer 7, and the surface on the side to be in contact with the adjacent separator 3).

The fuel cell separator according to the embodiments is excellent in corrosion resistance even in a highly corrosive environment.

In a fuel cell, fluoride ions are likely to be generated from a fluorine-based electrolyte resin such as a perfluorosulfonic acid-based polymer as described above. Therefore, when a fuel cell uses a solid electrolyte membrane comprising a fluorine-based electrolyte resin, the fuel cell separator according to the embodiments is particularly useful. Examples of the fluorine-based electrolyte resin include perfluorosulfonic acid-based polymers. Specific examples can include Nafion (trade name, manufactured by DuPont), Flemion (trade name, manufactured by Asahi Glass Co., Ltd.), and Aciplex (trade name, manufactured by Asahi Kasei Corporation). Among these, Nafion (trade name, manufactured by DuPont) can be suitably used because it is excellent in proton conductivity.

The embodiments can also be grasped as a method for containing Ti in a stainless steel substrate used for a fuel cell separator in order to prevent sensitization in the stainless steel substrate. In the method according to the embodiments, in addition to Ti, Ta is also contained as a sensitization inhibitor in some cases.

EXAMPLES

The embodiments will be described below based on Examples.

In the present Examples and Comparative Examples, SUS prototype materials E1 to E4 and C1 to C2 having compositions described in the following Table 1 were fabricated. Specifically, the SUS prototype materials were fabricated by button melting (small melting). Predetermined amounts of metals were melted in an argon atmosphere by arc heat using a non-consumable tungsten electrode, and solidified in a water-cooled copper mold to fabricate the SUS prototype material.

<Pitting Corrosion Resistance Test>

The above SUS prototype material E1 to E4 and C1 to C2 were used as test pieces, and the corrosion resistance of each test piece under strongly acidic conditions including fluorine ions and chlorine ions was examined by the following method.

Figure 4:
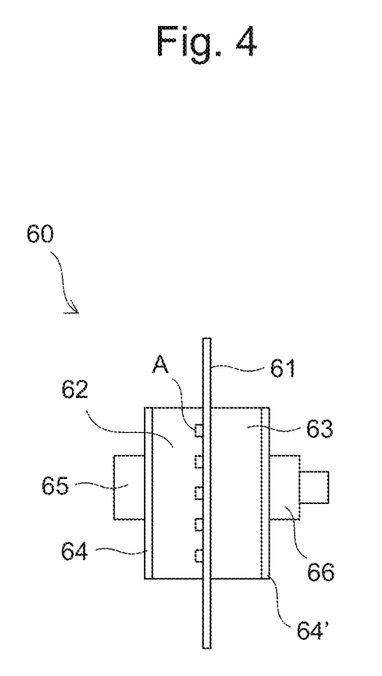
FIG. 4 is a schematic cross-sectional view for explaining the configuration of a gap formation member used in a pitting corrosion resistance test in the Examples.

First, NaF and NaCl were added to sulfuric acid (pH: 3.0) to prepare a sulfuric acid aqueous solution. Next, in an air open apparatus, each test piece was fixed to a gap formation member 60 as shown in FIG. 4, and immersed in the above sulfuric acid aqueous solution temperature-adjusted at 90° C. In FIG. 4, a test piece 61 was sandwiched between a cylindrical gap-forming material 62, a gasket 63, and washers 64 and 64', and further a bolt 65 was inserted into the bolt hole of the test piece 61, and then screwed using a nut 66. A plurality of grooves A are formed in a surface of the gap-forming material 62 so that gaps are formed between the gap-forming material 62 and the test piece. The gap-forming material 62 and the gasket 63 are made of a ceramic. The washers 64 and 64', the bolt 65, and the nut 66 are made of industrial pure titanium, but these are insulated from the test piece. A counter electrode comprising a platinum plate, and the test piece (sample electrode) were electrically connected in this state to produce a potential difference of 1.0 V between the counter electrode and the sample electrode. The potential of the test piece was kept constant by a reference electrode, and the test time was 2 hours. When a sudden increase in the current value (spike in current) was observed in this pitting corrosion resistance test (NaCl concentration: 10 ppm), the corrosion resistance was evaluated as F.

When no spike in current was observed in the above-described pitting corrosion resistance test (NaCl concentration: 10 ppm), a pitting corrosion resistance test (NaCl concentration: 30 ppm) was performed as in the pitting corrosion resistance test (NaCl concentration: 10 ppm) except that the concentration of NaCl was 30 ppm. When a spike in current was observed in this pitting corrosion resistance test (NaCl concentration: 30 ppm), the corrosion resistance was evaluated as E.

When no spike in current was observed in the above-described pitting corrosion resistance test (NaCl concentration: 30 ppm), a pitting corrosion resistance test (NaCl concentration: 50 ppm) was performed as in the pitting corrosion resistance test (NaCl concentration: 30 ppm) except that the concentration of NaCl was 50 ppm. When a spike in current was observed in this pitting corrosion resistance test (NaCl concentration: 50 ppm), the corrosion resistance was evaluated as D.

When no spike in current was observed in the above-described pitting corrosion resistance test (NaCl concentration: 50 ppm), a pitting corrosion resistance test (NaCl concentration: 70 ppm) was performed as in the pitting corrosion resistance test (NaCl concentration: 50 ppm) except that the concentration of NaCl was 70 ppm. When a spike in current was observed in this pitting corrosion resistance test (NaCl concentration: 70 ppm), the corrosion resistance was evaluated as C.

When no spike in current was observed in the above-described pitting corrosion resistance test (NaCl concentration: 70 ppm), a pitting corrosion resistance test (NaCl concentration: 90 ppm) was performed as in the pitting corrosion resistance test (NaCl concentration: 70 ppm)

except that the concentration of NaCl was 90 ppm. When a spike in current was observed in this pitting corrosion resistance test (NaCl concentration: 90 ppm), the corrosion resistance was evaluated as B.

When no spike in current was observed in the above-described pitting corrosion resistance test (NaCl concentration: 90 ppm), a pitting corrosion resistance test (NaCl concentration: 110 ppm) was performed as in the pitting corrosion resistance test (NaCl concentration: 90 ppm) except that the concentration of NaCl was 110 ppm. When a spike in current was observed in this pitting corrosion resistance test (NaCl concentration: 110 ppm), the corrosion resistance was evaluated as A.

Figure 8:
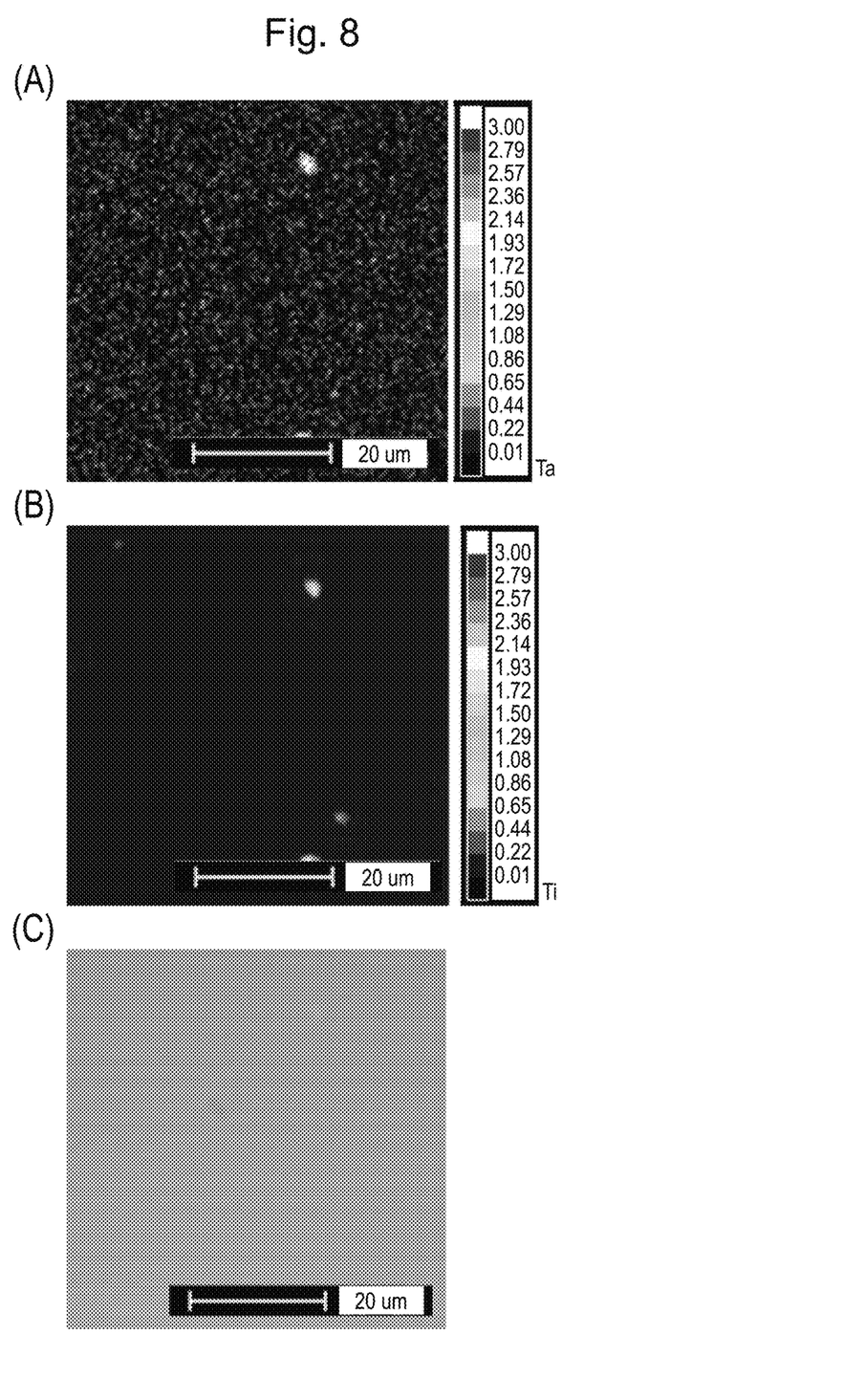
FIG. 8 shows EPMA images and an SEM image in which precipitates of Ti- and Ta-containing intermetallic compounds are observed for the SUS prototype material E4 obtained in Example 4.

The above-described results are summarized in Table 1.

obtained SUS prototype material E4 are shown in FIG. 8(A) and FIG. 8(B). From FIG. 8, it is seen that the precipitates are intermetallic compounds comprising Ti and Ta.

<SEM Analysis>

A cross section of the stainless steel substrate obtained in the Example was cut, and embedded in a resin, and then its surface was subjected to wet polishing to a mirror surface, and cross section observation was performed by SEM (magnification: 1000×). For the identification of Ti-containing intermetallic compounds or Ti- and Ta-containing intermetallic compounds, EDS was used, and the area ratio of precipitates determined as Ti-containing intermetallic compounds or Ti- and Ta-containing intermetallic compounds was measured. As a result, it was confirmed that the area

TABLE 1

| | Example 1 | Example 2 | Comparative Example 1 | Example 3 | Example 4 | Comparative Example 2 |
|---|---|---|---|---|---|---|
| | | 30Cr-2Mo base | | | 30Cr base | |
| | Prototype material E1 Ti addition | Prototype material E2 Ti + Ta addition | Prototype material C1 Nb addition | Prototype material E3 Ti addition | Prototype material E4 Ti + Ta addition | Prototype material C2 Nb addition |
| Cr | 30 | 30 | 30 | 30 | 30 | 30 |
| Mo | 2.0 | 2.0 | 1.9 | 0 | 0 | 0 |
| C | 0.01 | 0.01 | 0.01 | 0.01 | 0.01 | 0.01 |
| N | 0.01 | 0.01 | 0.01 | 0.01 | 0.01 | 0.01 |
| Si | 0.1 | 0.1 | 0.2 | 0.1 | 0.1 | 0.1 |
| P | 0.03 | 0.03 | 0.03 | 0.03 | 0.03 | 0.03 |
| S | 0.01 | 0.01 | 0.01 | 0.01 | 0.01 | 0.01 |
| Al | 0.04 | 0.04 | 0.07 | 0.04 | 0.04 | 0.04 |
| Mn | 0.1 | 0.1 | 0.1 | 0.1 | 0.1 | 0.1 |
| Nb | 0 | 0 | 0.1 | 0 | 0 | 0.2 |
| Ti | 0.3 | 0.3 | 0 | 0.3 | 0.3 | 0 |
| Ta | 0 | 0.1 | 0 | 0 | 0.1 | 0 |
| Fe | Balance | Balance | Balance | Balance | Balance | Balance |
| Corrosion resistance | B | A | E | D | C | F |

(Unit: % by mass)

For Example 1, Example 2, and Comparative Example 1, the results of studying the effect of Ti addition or Ti and Ta addition in 30Cr-2Mo-based SUS prototype materials are shown. From these results, it is seen that by adding Ti instead of Nb, excellent corrosion resistance can be obtained. In addition, it is seen that by also adding Ta in addition to Ti, superior corrosion resistance can be obtained. Similarly, for Example 3, Example 4, and Comparative Example 2, the results of studying the effect of Ti addition or Ti and Ta addition in 30Cr-based SUS prototype materials are shown. From these results, it is seen that by adding Ti instead of Nb, excellent corrosion resistance can be obtained. In addition, it is seen that by also adding Ta in addition to Ti, superior corrosion resistance can be obtained.

<TEM Analysis and EPMA Analysis>

Figure 5:
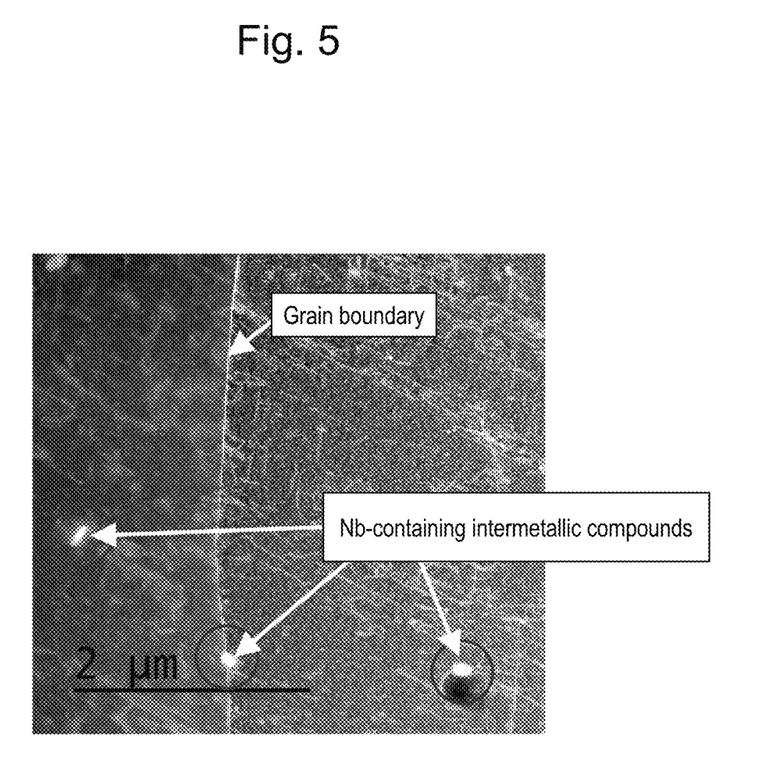
FIG. 5 is a TEM image of a SUS prototype material C1 obtained in Comparative Example 1.
Figure 6:
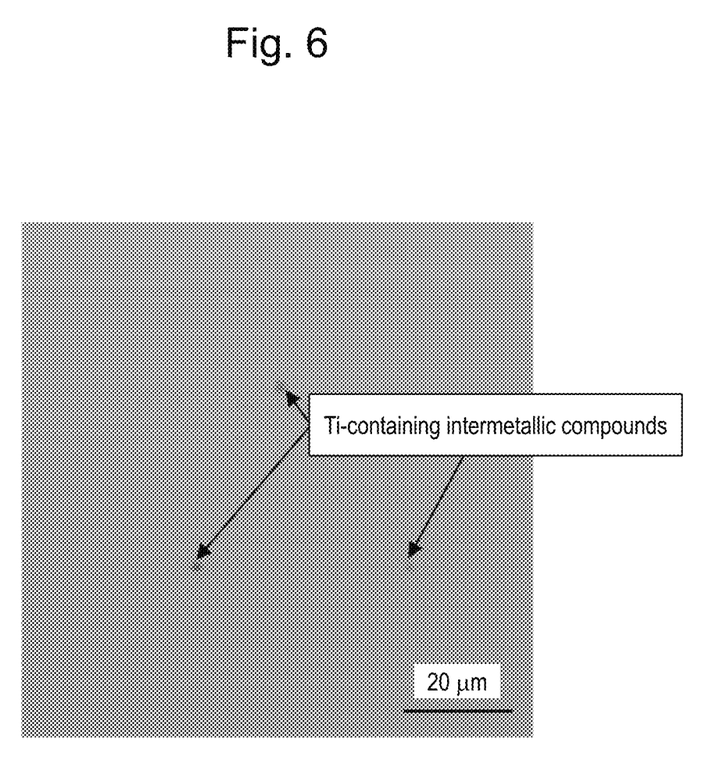
FIG. 6 is an SEM image of a SUS prototype material E1 obtained in Example 1.
Figure 7:
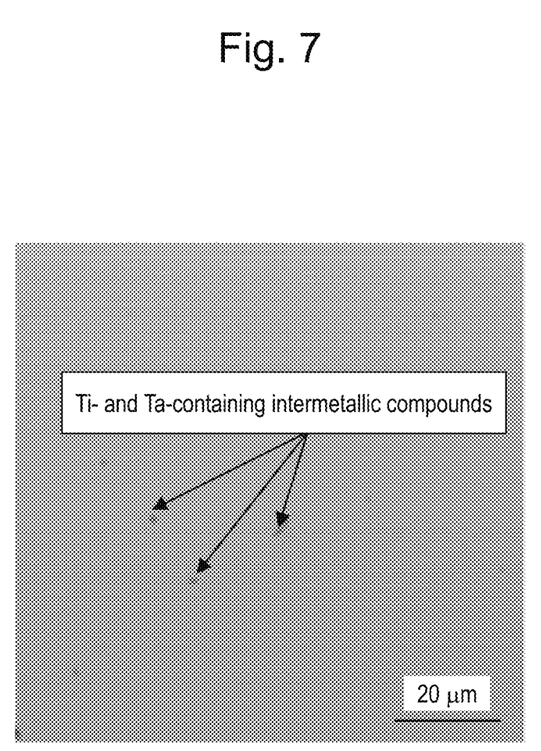
FIG. 7 is an SEM image of a SUS prototype material E4 obtained in Example 4.

A TEM image in which precipitates of Nb-containing intermetallic compounds are observed for the obtained SUS prototype material C1 is shown in FIG. 5. An SEM image in which precipitates of Ti-containing intermetallic compounds are observed for the obtained SUS prototype material E1 is shown in FIG. 6, and an SEM image in which precipitates of Ti- and Ta-containing intermetallic compounds are observed for the obtained SUS prototype material E4 is shown in FIG. 7. As shown in FIGS. 6 and 7, it is seen that in the SUS prototype materials E1 and E4, Ti-containing intermetallic compounds or Ti- and Ta-containing intermetallic compounds less likely to dissolve are precipitated.

EPMA images in which precipitates of Ti- and Ta-containing intermetallic compounds are observed for the ratio of precipitates of Ti or Ta carbonitride was 0.04% or less (0.03% or less in some instances) per 100 µm square in some cases from the viewpoint of corrosion resistance. The area ratio was calculated from the SEM images of FIG. 6 to FIG. 8.

The embodiment of the present disclosure has been described in detail above, but the specific configuration is not limited to the embodiments. Even if design changes are made without departing from the spirit of the present disclosure, they are included in the present disclosure.

DESCRIPTION OF SYMBOLS

1 Cell
2 MEGA
3 Separator
4 Membrane electrode assembly (MEA)
5 Electrolyte membrane
6 Electrode
7 Gas diffusion layer
10 Fuel cell stack
21 Gas flow path
22 Gas flow path
23 Coolant flow path
60 Gap formation member
61 Test piece
62 Gap-forming material
63 Gasket
64 Washer 64' Washer
65 Bolt
66 Nut

What is claimed is:

1. A stainless steel substrate used for a polymer electrolyte fuel cell separator, the stainless steel substrate comprising Ti; greater than or equal to 0.1% by mass Ta; greater than or equal to 1.5% by mass Mo; and substantially no Nb, wherein the stainless steel substrate is austenitic or austenitic-ferritic duplex.

2. The stainless steel substrate according to claim 1, wherein a content of the Ti is 0.1 to 0.5% by mass.

3. The stainless steel substrate according to claim 1, wherein a content of the Ta is 0.1 to 0.5% by mass.

4. A polymer electrolyte fuel cell separator comprising a stainless steel substrate, wherein the stainless steel substrate comprises Ti; greater than or equal to 0.1% by mass Ta; greater than or equal to 1.5% by mass Mo; and substantially no Nb, wherein the stainless steel substrate is austenitic or austenitic-ferritic duplex.

5. The polymer electrolyte fuel cell separator according to claim 4, wherein a content of the Ti is 0.1 to 0.5% by mass.

6. The polymer electrolyte fuel cell separator according to claim 4, wherein a content of the Ta is 0.1 to 0.5% by mass.

7. A polymer electrolyte fuel cell comprising:
   the polymer electrolyte fuel cell separator according to claim 4; and
   a solid electrolyte membrane.

8. The polymer electrolyte fuel cell according to claim 7, wherein the solid electrolyte membrane comprises a fluorine-based electrolyte resin.

* * * * *